Oct. 3, 1967
L. D. PERKINS 3,345,560
CABLE FLAW DETECTOR HAVING REMOVABLY MOUNTED SENSOR
MEANS AND INCLUDING BRACKET AND WHEEL MEANS FOR
MAINTAINING THE SENSOR AT A PREDETERMINED
DISTANCE FROM THE CABLE
Filed Nov. 27, 1964
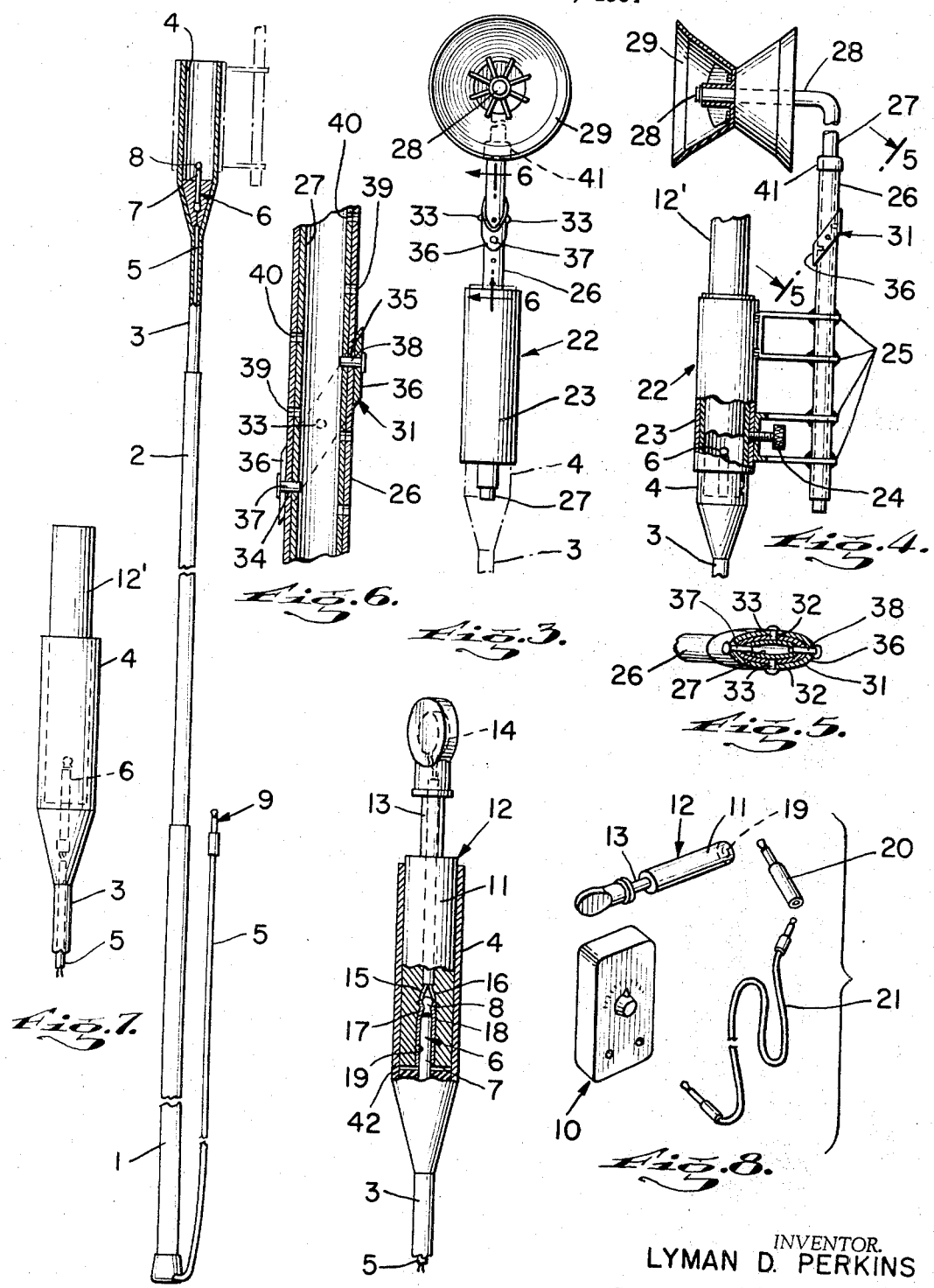
INVENTOR.
LYMAN D. PERKINS
BY
Harold J. DeLeConte
ATTORNEY

United States Patent Office 3,345,560
Patented Oct. 3, 1967

3,345,560
CABLE FLAW DETECTOR HAVING REMOVABLY MOUNTED SENSOR MEANS AND INCLUDING BRACKET AND WHEEL MEANS FOR MAINTAINING THE SENSOR AT A PREDETERMINED DISTANCE FROM THE CABLE
Lyman D. Perkins, Woodland Hills, Calif.
(4637 Willis Ave., Apt. 304, Sherman Oaks, Calif. 91403)
Filed Nov. 27, 1964, Ser. No. 414,215
2 Claims. (Cl. 324—52)

This invention relates to flaw and leak detection in telephone cables and more particularly to the novel optional mounting means for sensor devices carried on an extensible pole device. The invention is particularly useful in locating air leaks and shorts or other defects in telephone cables. The invention constitutes an improvement over that described and claimed in my prior Patent No. 2,890,408 granted June 9, 1959.

The invention of my said prior patent included, among other features, a pickup coil fixedly mounted in the end of one of the members of a telescopically extendible pole construction and, accordingly, was limited to the detection of shorts in a cable. In more recent years, telephone cables contain air under pressure and it becomes important to detect any leaks from which the air is escaping. Since such leaks do not involve shorts in the circuits within the cable, the use of a pickup coil would fail to indicate such leaks. The best means for discovering the location of air leaks has been the use of an extremely sensitive microphone at a fixed distance from the cable with suitable amplifying means to make the sensed signal either audibly or visually evident.

Having these considerations in mind, it is the principal object of this invention to provide an extensible pole of the general type shown in my said prior patent with means affording the interchangeable mounting thereon of either an electrical short detecting coil or an air escape detecting means.

Another object of the invention is the provision in connection with a device embodying the first objective of means for assuring that the sensor unit is constantly positioned at a predetermined distance from the cable being subjected to inspection.

A still further object of the invention is to provide a distance assuring means for the sensor relative to the cable which is of light weight and is readily attachable to and detachable from the extensible pole and which, further, is capable of adjustment to vary the distance of the sensor means from the cable which is being subjected to inspection.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a side elevational view of an extensible pole embodying the invention, portions of the pole structure being shown in section and certain other portions thereof being broken away or omitted to conserve space, FIG. 2 is an enlarged scale side elevational view of the pole or sensor receiving socket portion of the pole showing a pickup coil sensor installed therein, FIG. 3 is a side elevational view of a wheel attachment for detachable mounting on the exterior surface of the socket, FIG. 4 is a side elevational view taken at right angles to FIG. 3, with portions broken away to show the mode of mounting of the attachment on the exterior of the socket, FIG. 5 is a fragmentary transverse section in enlarged scale showing details of the latch element by which the position of the cable strand engaging wheel relative to the sensor is adjusted, the view being taken on the line 5—5 of FIG. 4, FIG. 6 is an enlarged scale sectional view of the latch means as viewed on the line 6—6 of FIG. 3, FIG. 7 is a view of the socket end of the pole with a microphone type of sensor mounted therein, and FIG. 8 is an exploded perspective view showing a detachable sensor element employed as a hand probe.

Having reference first to FIG. 1 of the drawings, the pole portion comprises hollow telescopically arranged tapered tubular sections 1, 2 and 3 each having a smaller end which is of slightly less internal diameter than the larger outside diameter of the tube element nested therein so that said tubes may be extended into tight frictional interengagement with each other in the manner taught in my said prior patent as shown in FIG. 1 of this application.

Next referring to all of the drawings, the distal end of the smaller or outer end of the tube element 3 is provided with an axially disposed tubular socket 4 for selective reception of the particular sensor element to be employed. A flexible two-wire conductor 5 extends through the interior of the tubes and terminates in a double contact plug 6 including a ball end contact 7 and a cylindrical side contact surface 8 said surfaces being connected one each to the pair of the conductor elements in the conductor 5 and the opposite end of said conductor is likewise provided with a two-contact surface plug element connected to appropriate conductor elements of the conductor 5. The plug 9 may be inserted in a complementary socket in an amplifier unit to produce either a visible or an audible signal. Such units are common articles of commerce and a typical one is illustrated at 10 in FIG. 8.

Removably inserted in the socket 4 is the cylindrical base 11 of a sensor unit 12 having an extension portion 13 beyond the socket and housing a pickup coil 14. The coil of the sensor unit 12 is electrically connected by leads 15 and 16 to contact elements 17 and 18 in a cylindrical recess 19 in the end of the sensor unit disposed within the socket and electrically conductively engaging the respective plug contact surfaces 7 and 8 this being a conventional plug and jack type of connection.

A microphone unit 12′ (see FIG. 7) may be interchangeably installed in the socket 4 and electrically connected by the plug 6 to suitable amplifying means. The particular microphone shown is a standard article of commerce and further description thereof is deemed to be unnecessary.

Thus, the pole assembly of my said prior patent, when modified by the substitution of the sensor unit receiving socket 4 is rendered available for interchangeably accommodating different types of sensor units, i.e., those responding to an electrical field abnormality produced by a short or those responding to an audio abnormality as from compressed air escaping from a leak in the cable sheath; it being understood that suitable amplifying and signal producing apparatus would be connected to the plug 9 to accommodate the particular sensor unit to be employed. This detachable mounting of the sensor has another important advantage in that the detached sensor may be directly connected to the signal producing means 10 by means of a converter plug and jack and a flexible conductor 21 thereby adapting the unit for use in close quarters with the sensor held in the hand of the user.

Next, more particularly considering FIGS. 3, 4, 5 and 6, there is shown the detachable mounting means for a wheel at the end of a pole adapted to run on the supporting strand for a cable and thus to maintain a sensor element at a fixed distance from the cable. This is particularly desirable when using the microphone sensor to detect air leaks. The wheel and its supporting means comprises a mounting bracket element 22 having a sleeve 23 closely detachably surrounding the exterior of the socket 4 and clampingly secured thereon by any suitable means as, for example, a thumb screw 24. Fixed to the exterior of the sleeve portion 23 is a lateral bracket means comprising parallel arms 25 projecting laterally therefrom and the distal ends of said arms carry a tube 26 fixed thereto and extending parallel to but laterally offset from the sleeve 23, the end of said sleeve extending outwardly beyond the open end of the socket 4.

Slidingly mounted in the tube 26 is a second tube 27 having the distal end 28 thereof bent at right angles to serve as the axle for a grooved wheel element 29 freely rotatable thereon and secured against endwise movement on said axle by any suitable means and having a peripheral groove 30 thereof disposed substantially in the axial line of the socket 4.

The portion of the tube 26 beyond the socket 4 carries a pivotally mounted latch member 31 comprising a cross sectional portion of a resilient metal tube of a size closely fitting the exterior of the tube 26 and cut at an acute angle with respect to the axial line of the tube from which it was cut, the latch member thus, as viewed in plan, having an elongated oval configuration.

The tube 26 is provided with a diametrically opposite pair of holes 32, 32 and the latch member 31 carries a pair of opposed stud elements 33, 33 projecting inwardly from the sides thereof at its minor diameter and freely engaging the holes 32, 32 as the pivotal mounting for the latch member.

The tube 26 is further provided with holes 34 and 35 at opposite sides thereof and at right angles to the holes 32, 32 and disposed opposite the end portions 36, 36 of the latch member when the latch member is swung into a position on the axis of the stud elements 33, 33 at which the inner faces of said end portions lie parallel to the outer surface of the tube 26 as shown in FIGS. 4 and 6. The end portions of the latch member carry inwardly projecting studs 37 and 38 which engage the holes 34 and 35 and also extend through selected ones of the aligned holes 39 and 40 in the tube 26 to position the tube 26 and the roller carried thereby at any one of a plurality of positions, the latch thus serving not only to lock the tubes in adjusted longitudinal positions but also to hold the tube 27 against rotative movement in the tube 26. When adjustment is desired, the latch member is swung clockwise as viewed in FIGS. 4 and 6 until the studs 37 and 38 are clear of the holes in the tube 27 and that tube is then moved longitudinally to the desired position, after which, the latch member is again swung back to project the pins 37 and 38 into the appropriate holes 39 and 40 in the tube 27. If desired, a cap end 41 may be applied to the outer end of the tube 26. Also a drain hole 42 may be provided at the bottom of the socket 4.

While in the foregoing specification there has been disclosed a presently preferred embodiment of the invention, the invention is not to be deemed to be limited to the precise details of construction thus shown by way of example and it will be understood that the invention includes as well all such changes and modifications in the parts and in the construction, combination and arrangement of parts as shall come within the purview of the appended claims.

I claim:

1. In a flaw detector means for telephone and similar plural conductor cables, an elongated hollow pole through which a pair of electrical conductors extend, said pole having a receptor means at one end thereof, a microphone removably mounted in said receptor means, said microphone having an exposed audio signal receiving area, a pair of electrical contacts in said receptor means connected to one each of said conductors and positioned for engagement with complementary contact means on said microphone as an incident to insertion of said microphone into said receptor means and effecting electrically conductive connection between electrical circuit means in said microphone and said electrical conductors when said microphone is inserted in said receptor means; said electrical conductors extending beyond the opposite end of said hollow rod and terminating in means affording connection to a signal amplifying means, a bracket means detachably secured to said pole at the end thereof having said receptor means, and a freely rotatable wheel carried by said bracket means and disposed with the axis thereof extending transversely to the axial line of said pole and disposed a predetermined distance beyond the audio signal receptive area of said microphone; said wheel having a peripheral, cable engaging groove disposed substantially coincident with the center line of said receptor means and said microphone.

2. A flaw detector means as claimed in claim 1 in which said bracket means is adjustable to vary the distance between said wheel and said microphone.

References Cited

UNITED STATES PATENTS

| | | | |
|---|---|---|---|
| 1,558,211 | 10/1925 | Williams | 339—109 X |
| 2,103,179 | 12/1937 | Rennau | 324—52 |
| 2,291,533 | 7/1942 | Cummings | 324—52 X |
| 2,518,518 | 8/1950 | Beldi | 324—54 |
| 2,698,921 | 1/1955 | Wharton | 324—52 |
| 2,890,408 | 6/1959 | Perkins | 324—52 |

FOREIGN PATENTS

| | | |
|---|---|---|
| 224,235 | 2/1958 | Australia. |
| 472,700 | 4/1951 | Canada. |
| 33,107 | 7/1934 | Netherlands. |

RUDOLPH V. ROLINEC, *Primary Examiner.*

WALTER L. CARLSON, *Examiner.*

G. R. STRECKER, *Assistant Examiner.*